US011821786B1

(12) United States Patent
Hasegawa et al.

(10) Patent No.: US 11,821,786 B1
(45) Date of Patent: Nov. 21, 2023

(54) PYRANOMETER

(71) Applicant: EKO INSTRUMENTS CO., LTD., Tokyo (JP)

(72) Inventors: Toshikazu Hasegawa, Tokyo (JP); Satoshi Nishikawa, Tokyo (JP); Masayuki Yamada, Tokyo (JP)

(73) Assignee: EKO INSTRUMENTS CO., LTD., Tokyo (JP)

( * ) Notice: Subject to any disclaimer, the term of this patent is extended or adjusted under 35 U.S.C. 154(b) by 0 days.

(21) Appl. No.: 17/928,324

(22) PCT Filed: May 10, 2022

(86) PCT No.: PCT/JP2022/019867
§ 371 (c)(1),
(2) Date: Nov. 29, 2022

(51) Int. Cl.
*G01J 1/42* (2006.01)
*G01J 1/44* (2006.01)

(52) U.S. Cl.
CPC .... *G01J 1/42* (2013.01); *G01J 1/44* (2013.01); *G01J 2001/4285* (2013.01); *G01J 2001/444* (2013.01)

(58) Field of Classification Search
CPC ........ G01J 1/42; G01J 1/44; G01J 2001/4285; G01J 2001/444
See application file for complete search history.

(56) References Cited

U.S. PATENT DOCUMENTS

| 2012/0055244 A1 | 3/2012 | Dolce | |
| 2018/0038738 A1* | 2/2018 | Hoeksema | G01J 5/051 |

FOREIGN PATENT DOCUMENTS

| CN | 203415243 U | 1/2014 |
| CN | 108387220 | 8/2018 |
| EP | 3875928 | 9/2021 |
| GB | 1 429 473 A | 3/1976 |
| JP | 5-231932 | 9/1993 |
| JP | 10-165746 | 6/1998 |
| JP | 2008-256606 | 10/2008 |
| JP | 2015-14581 | 1/2015 |
| JP | 2017-58364 | 3/2017 |
| JP | 2022-100256 | 7/2022 |
| WO | 2016/140565 | 9/2016 |
| WO | 2016/140566 | 9/2016 |
| WO | 2016/140567 | 9/2016 |

OTHER PUBLICATIONS

Sep. 13, 2022 Decision to Grant in corresponding JP 2022-549646 and translation thereof.

* cited by examiner

*Primary Examiner* — Georgia Y Epps
*Assistant Examiner* — Don J Williams
(74) *Attorney, Agent, or Firm* — GREENBLUM & BERNSTEIN, P.L.C.

(57) ABSTRACT

A pyranometer is provided which can measure the precise amount of solar radiation/solar irradiance continuously and stably while suppressing the generation of dew or frost by a simple configuration even in changing external environment. A pyranometer includes: a housing having an opening, and having thermal conductivity; a dome provided at the opening, and having light transmittance; a sensor part provided in an internal space formed by the housing and the dome, and for measuring an intensity of a sunlight made incident through the dome; and a heat generating element provided heat conductably to a part of the housing, opposite to the opening across the internal space.

7 Claims, 4 Drawing Sheets

PYRANOMETER

TECHNICAL FIELD

The present invention relates to a pyranometer for measuring the amount of solar radiation.

BACKGROUND ART

As a measuring instrument for measuring the intensity of a sunlight (amount of solar radiation/solar irradiance), an article is known which detects the solar emitted light by a prescribed detector, and measures the meteorological amount regarding the solar radiation. Especially, a device called an pyranometer has been widely used. For example, with the pyranometer described in Patent Document 1, a thermal type sensor is used for the detector.

With such a pyranometer, dew or frost is deposited on the dome according to external environment, so that the amount of an emitted light passing through the dome is increased or decreased. The pyranometer described in Patent Document 1 is configured such that a heat generating component is brought into thermal contact with at least a part of the dome in order to suppress generation of dew or frost generated at the dome, thereby heating the dome. Further, Patent Document 2 describes a pyranometer in which the air inside the pyranometer is heated, and the heated air is circulated in a dome of a double structure by a ventilator, thereby suppressing generation of dew or frost generated at the dome.

CITATION LIST

Patent Document

Patent Document 1: Patent Publication EP-A-3875928
Patent Document 2: WO 2016/140566

SUMMARY

Technical Problem

Herein, with the pyranometer described in Patent Document 1, the heat generating component is brought into thermal contact with the dome. For this reason, the heat of the heat generating component is merely supplied to the dome by local thermal conduction. At this step, for example, when the temperature of the housing is decreased by external environment, the heat from the heat generating component escapes to the housing, which makes it difficult to continuously supply a heat to the dome with stability. As a result, dew or frost may have not been sufficiently suppressed from being generated.

On the other hand, such a pyranometer as described in Patent Document 2 has a movable part referred to as a ventilator, and hence is inferior in durability, and the movable part requires a driving electric power, and hence consumes energy. As a result, undesirably, others than the heat generating component also generate a heat.

Under such circumstances, it is an object of the present invention to provide a pyranometer capable of measuring the precise amount of solar radiation continuously and stably while suppressing generation of dew or frost by a simple configuration even in changing external environment.

Solution to Problem

A pyranometer in accordance with one aspect of the present invention includes: a housing having an opening, and having thermal conductivity; a dome provided at the opening, and having light transmittance; a sensor part provided in an internal space formed by the housing and the dome, and for measuring an intensity of a sunlight made incident through the dome; and a heat generating component provided heat conductably at a part of the housing, opposite to the opening across the internal space.

In accordance with this aspect, the heat generating component is provided opposite to the opening at which the dome is provided in a housing. The heat generated by the heat generating component is first conducted to the housing having thermal conductivity, thereby heating the whole housing. Further, the heat of the heated housing is propagated to the dome provided at the opening of the housing. Further, the radiant heat from the housing heats the air around the dome. As a result, the dome and the air around the dome are warmed, so that generation of dew or frost is suppressed. With the pyranometer in accordance with the present aspect, the heating component heats the whole housing with a large heat capacity. For this reason, the temperature of the whole housing is less likely to be changed even when external environment is changed, so that the dome is heated continuously and stably.

Advantageous Effects of Invention

The present invention can provide a pyranometer capable of measuring the precise amount of solar radiation continuously and stably while suppressing generation of dew or frost by a simple configuration even in changing external environment.

DESCRIPTION OF EMBODIMENTS

Figure 1:
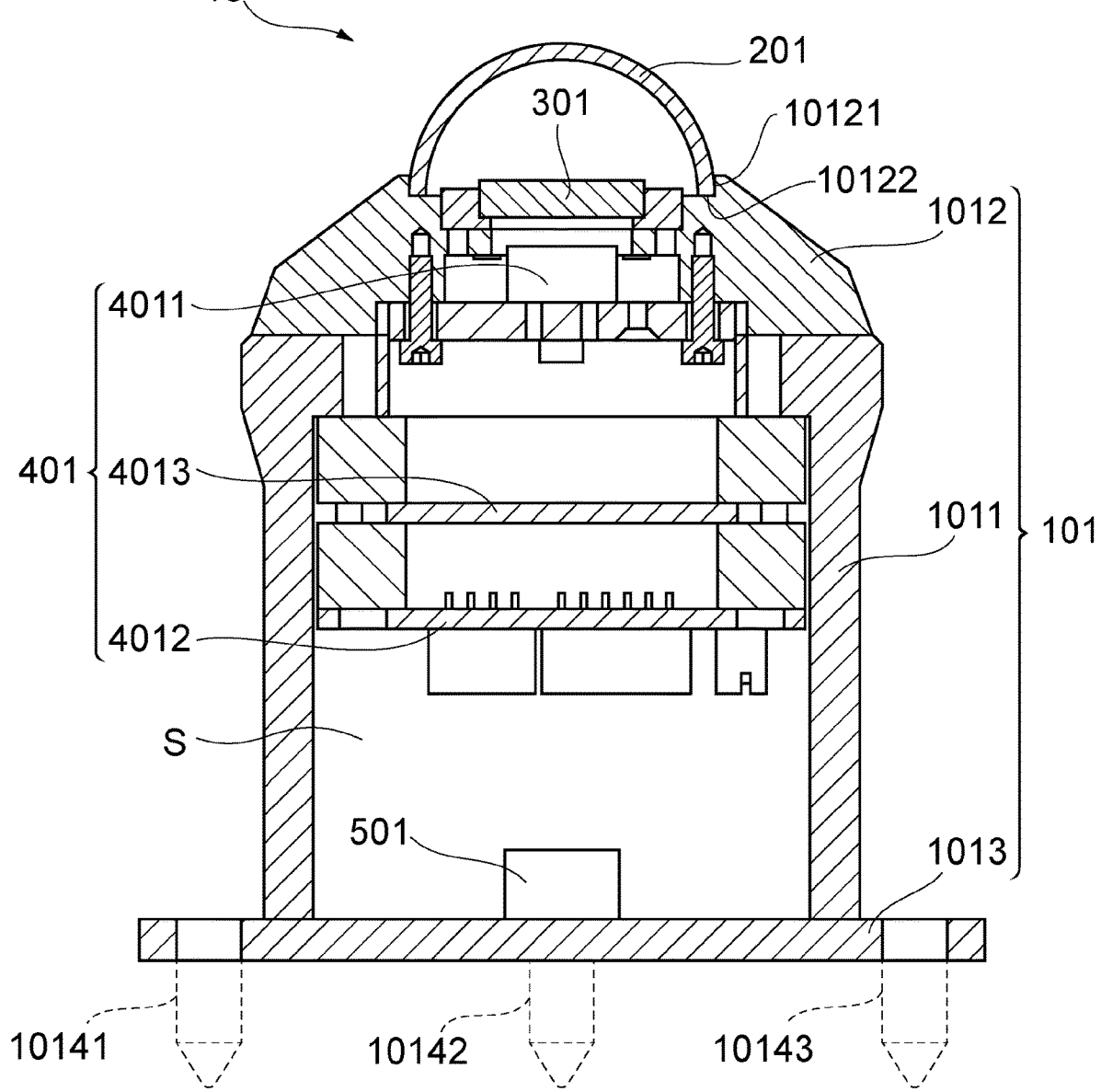
FIG. 1 is a cross sectional view of a pyranometer in accordance with the present embodiment.

By reference to the accompanying drawings, preferred embodiments of the present invention will be described. Incidentally, in respective drawings, the ones given the same reference numerals and signs have the same or similar configuration. Incidentally, in the following description, the upper side of the drawing is referred to as "upper"; the lower side, as "lower"; the left side, as "left"; and the right side as "right".

FIG. 1 shows a cross sectional view of a pyranometer 10 in accordance with the present embodiment. The pyranometer 10 is a device for measuring solar irradiance with respect to the incident light from the hemispheroidal range as seen from the pyranometer 10. The pyranometer 10 has, for example, a housing 101, a dome 201, a diffuser 301, a sensor part 401, and a heat generating element 501.

The housing 101 has a barrel part 1011, a ceiling part 1012, a bottom part 1013, and a leg parts 10141, 10142, and 10143. The housing 101, particularly, the barrel part 1011, the ceiling part 1012, and the bottom part 1013 are preferably formed of a material having a prescribed or more strength, and a thermally conductive material having a prescribed or more thermal conductivity, and is preferably formed of, for example, a metal material such as aluminum, brass, or alloy iron.

The barrel part 1011 has, for example, a cylindrical shape, is connected at the upper end thereof with the ceiling part 1012, and is connected at the lower end thereof with the bottom part 1013.

The ceiling part 1012 has, for example, a truncated conical shape, and has an opening 10121. The opening 10121 is provided at the top of the ceiling part 1012. The opening 10121 penetrates from the upper surface to the lower surface of the ceiling part 1012. The opening 10121 is stepped in the vicinity of the upper surface, and has a dome adhesion surface 10122 at the stepped portion.

The bottom part 1013 has, for example, a flat-sheet shape, and is connected with the lower end of the barrel part 1011. The bottom part 1013 has a function as the base of the pyranometer 10.

The leg parts 10141, 10142, and 10143 are provided at the bottom part 1013. The pyranometer 10 is set at the installation surface (not shown) via the leg parts 10141, 10142, and 10143.

The dome 201 has, for example, a hemispheroidal shape, and is provided at the opening 10121. The dome 201 is glued at the circumferential edge thereof to the dome adhesion surface 10122, and thereby is mounted at the housing 101. The shape of the dome 201 may not be necessarily a perfect hemispheroidal shape, and may only be a shape capable of taking in a light from all directions of the sky. The dome 201 can be formed of, for example, a material having a light transmittance such as glass.

The side surface inside the barrel part 1011, the upper surface of the bottom part 1013, and the inner surface of the dome 201 form the internal space S in the housing 101.

The diffuser 301 is an optical component configured so as to diffuse and transmit an incident light therethrough. The diffuser 301 is arranged at a position opposed to a sensor element 4011 described later, and is configured such that a light passing though the dome 201 is diffused and transmitted through the diffuser 301, and is made incident upon the sensor element 4011.

The sensor part 401 includes a sensor element 4011 and circuit boards 4012 and 4013. The sensor element 4011 is provided at a position opposite to the dome 201 across the diffuser 301 in the internal space S of the housing 101. The sensor element 4011 is a detecting means capable of outputting an electric energy in accordance with the light amount of the solar radiation, and is, for example, a thermal type sensor. As the thermal type sensor, for example, a thermocouple, a thermistor, a Peltier element, or a thermopile can be used. When the sensor element 4011 is a thermocouple, the sensor element 4011 is configured such that an incident light (light energy) is converted into a heat (heat energy), and an electric signal corresponding to the heat is outputted.

The circuit boards 4012 and 4013 are provided in the internal space S of the housing 101. The circuit boards 4012 and 4013 are connected with the sensor element 4011 and the heat generating element 501 via a wire (not shown). The circuit boards 4012 and 4013 are each provided with a circuit for performing signal processing and control at the pyranometer 10. For example, each circuit (described later) provided at the circuit boards 4012 and 4013 processes an electric signal from the sensor element 4011, and calculates the amount of solar radiation, or the like. Each circuit of the circuit boards 4012 and 4013 is connected with an external device and a power supply (not shown). The pyranometer 10 can communicate with the external device, and can be supplied with power supply via the circuit. Incidentally, the number of the circuit boards is not required to be two as shown in FIG. 1, may be one, and may be more plural.

The sensor element 4011 and each circuit provided at the circuit boards 4012 and 4013 form the sensor part 401 for calculating the solar irradiance, or the like in a functionable manner.

The heat generating element 501 is a circuit element as a component for generating a heat according to the electric power consumption (heat generating component). The heat generating element 501 is provided opposite to the opening 10121 across the internal space S so as to be in contact with the bottom part 1013. Incidentally, the wording "opposite across the internal space S" does not mean the geometrically exactly opposite position, and is a wide concept including the inner surface region of the housing 101 such that the opening 10121 and the heat generating element 501 are separated from each other by the internal space S. The region is, at least, the region except for the vicinity of the opening 10121. For example, the region is the central part of the bottom part 1013 at the position opposite to the ceiling part 1012 having the opening 10121. The heat generating element 501 is provided in a manner enabling the thermal conduction to the housing 101 via the bottom part 1013. The heat generating element 501 is, for example, screwed and mounted to the bottom part 1013 so as to be thermally connected with the housing 101. Further, the heat generating element 501 may be mounted to the bottom part 1013 using a heat dissipating seal or a heat dissipating adhesive. The heat generating element 501 is preferably a circuit element having a relatively large heating value, and capable of controlling the heating value, and is, for example, a MOS-FET. Further, the heat generating element 501 may be an element such as a bipolar transistor, a J-FET, an IGBT, or a diode.

The heat generating element 501 is, for example, connected to a power supply common with the power supply for driving the sensor part 401. The heat generating element 501 is supplied with a power supply, and generates a heat according to the electric power consumption in the heat generating elements 501. The heat generated by the heat generating element 501 is first transmitted to the bottom part 1013. The heat transmitted to the bottom part 1013 is transmitted to the barrel part 1011, and is transmitted to the ceiling part 1012. As a result, the whole housing 101 is heated by the heat generating element 501. The housing 101 transmits a heat to the dome 201 via the ceiling part 1012. As a result, the dome 201 is heated. Further, the radiant heat radiated from the ceiling part 1012 warms the air in the periphery of the dome 201. The dome 201 and the air around the dome 201 are heated, resulting in an increase in the temperature of the dome 201 and the temperature of the air in the periphery of the dome 201. This suppresses the generation of dew or frost at the dome 201.

With the pyranometer 10, heating of the whole housing 101 increases the stability of the temperature of the dome 201 against the change in external environment such as wind or rain. This is because the housing 101 is larger in size than the dome 201, and is sufficiently larger in heat capacity than the dome 201. Therefore, when the decrease in temperature due to external environment is caused at each of the housing 101 and the dome 201, the temperature reduction amount of the housing 101 relative to the temperature reduction amount of the dome 201 is reduced. Accordingly, a heat is continuously supplied from the housing 101 to the dome 201, so that the stability of the temperature of the dome 201 against a change in external environment is increased. As a result, it becomes possible to measure the precise solar irradiance continuously and stably while suppressing the generation of dew and frost even in changing external environment.

Figure 2:
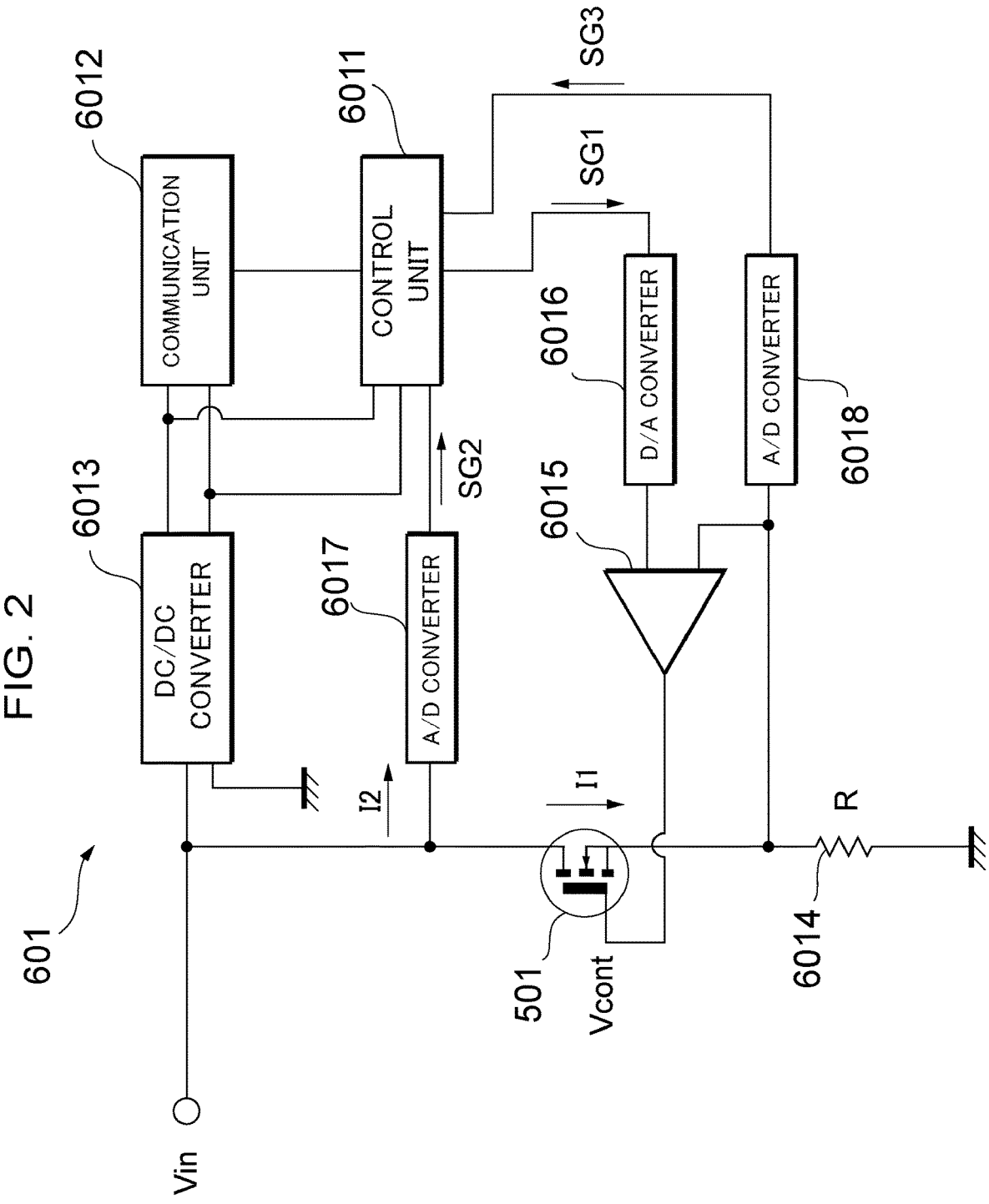
FIG. 2 is a view for illustrating the outline of the circuit configuration of the pyranometer in accordance with the present embodiment.

The heating control of the heat generating element 501 will be described by reference to FIG. 2. FIG. 2 shows the circuit diagram of a circuit 601 including the heat generating element 501 and each circuit provided at the circuit boards 4012 and 4013. FIG. 2 illustrates, as one example, the heat generating element 501 as a MOS-FET. For the heat generating element 501, the gate is connected with an operational amplifier 6015, the drain is connected with a power supply, and the source is connected with a ground via a resistance element 6014.

The circuit 601 has the heat generating element 501, the CONTROL UNIT 6011, the communication unit 6012, the DC/DC converter 6013, the resistance element 6014, the operational amplifier 6015, the D/A converter 6016, and the A/D converters 6017 and 6018.

The CONTROL UNIT 6011, the D/A converter 6016, and the A/D converters 6017 and 6018 are implemented as a circuit in a microcontroller. Incidentally, for example, the D/A converter 6016, and the A/D converters 6017 and 6018 are not necessarily required to be provided at the microcontroller, and may be respectively independent elements.

The CONTROL UNIT 6011 is a functional block implemented by executing a software program including a microcontroller stored in a memory. The CONTROL UNIT 6011 can calculate, for example, the solar irradiance based on a signal from the sensor element 4011. The solar irradiance calculated based on a signal from the sensor element 4011 can be used, for example, for calculation of the integrated solar irradiance in a given day by a computer connected to the outside of the pyranometer 10.

Further, in the memory of the CONTROL UNIT 6011, the calibration factor for calculating the solar irradiance is stored. The CONTROL UNIT 6011 measures the solar irradiance by using a common calibration factor in any of a first state in which the heat generating element 501 generates a heat and a second state in which the heat generating component does not generate a heat. This is the advantage resulting from the arrangement of the heat generating element 501 with respect to the sensor part 401 across the internal space S in the pyranometer 10. As a result, the heat from the heat generating component becomes less likely to be supplied to the sensor part. This eliminates the necessity of differently using the calibration value only for at the time of heat generation and the calibration value for not at the time of heat generation in the measurement by the pyranometer. Thus, it becomes possible to use the same calibration factor not depending upon on or off of the heat generating function of the heat generating component. Further, as distinct from the case using the calibration factor only for at the time of heat generation, it is not necessary to normally turn the heat generating function of the heat generating component on all the time. Furthermore, the heat generating function of the heat generating component can be automatically turned on or off based on the temperature of external environment and the solar irradiance measured with the pyranometer 10. In this manner, it is possible to enhance the reliability of the measurement. Specifically, it is possible to perform measurement having the exactness ensuring the class A precision in the standard of the pyranometer of ISO9060.

The communication unit 6012 is a communication circuit for performing communication between the pyranometer 10 and the external device. The communication unit 6012 is, for example, connected with a communication cable, and performs communication with an external device (e.g., a data logger or a personal computer) via the communication cable. The solar irradiance calculated by the CONTROL UNIT 6011 is transmitted to an external device via the communication unit 6012.

The DC/DC converter 6013 converts the power supply voltage (Vin) of the power supply supplied to the pyranometer 10 into a voltage necessary for the operations of the CONTROL UNIT 6011 and the communication unit 6012.

The resistance element 6014 is provided between the source of the heat generating element 501 and the ground.

For the operational amplifier 6015, the input is connected with between the heat generating element 501 and the resistance element 6014, and the output of the D/A converter 6016, and the output is connected with the gate of the heat generating element 501. The operational amplifier 6015 applies a control voltage Vcont to the gate of the heat generating element 501 based on the terminal voltage on the heat generating element 501 side of the resistance element 6014, and the voltage supplied from the D/A converter 6016. The operational amplifier 6015 performs feedback control so as to make the heating value of the heat generating element 501 constant.

The D/A converter 6016 is provided so that the input of the operational amplifier 6015 and the CONTROL UNIT 6011 are connected The D/A converter 6016 converts a digital signal SG1 from the CONTROL UNIT 6011 into an analog signal, and supplies the voltage based on the converted analog signal to the operational amplifier 6015.

The A/D converter 6017 is provided so that a point between the power supply voltage and the drain of the heat generating element 501 and the CONTROL UNIT 6011 are connected with each other. The A/D converter 6017 acquires, for example, the power supply voltage Vin as an analog signal, converts the acquired analog signal into a digital signal SG2, and outputs the digital signal SG2 to the CONTROL UNIT 6011.

The A/D converter 6018 is provided so as to connect a point between the heat generating element 501 and the resistance element 6014, and the CONTROL UNIT 6011. The A/D converter 6018 acquires, for example the voltage between the heat generating element 501 and the resistance element 6014 as an analog signal, converts the acquired analog signal into a digital signal SG3, and outputs the digital signal SG3 to the CONTROL UNIT 6011.

A description will be given to the control of the operation of the heat generating element 501 by the CONTROL UNIT 6011. First, an electric power consumption P in the heat generating element 501 is set according to a prescribed heating value of the heat which should be generated by the heat generating element 501. The value of the electric power consumption P is stored in, for example, the memory of the CONTROL UNIT 6011. The CONTROL UNIT 6011 outputs a digital signal SG1 so that operation voltage in the heat generating element 501×current I1=electric power consumption P. The digital signal SG1 is determined by a digital signal SG2 based on a power supply voltage Vin. The control voltage Vcont supplied to the heat generating element 501 is controlled based on the digital signal SG1. The heat generating element 501 is connected with a power supply common with the power supply (power supply for driving the sensor part) of the CONTROL UNIT 6011. This eliminates the necessity of separately providing a power supply to the heat generating element 501. For this reason, the configuration of the circuit is simplified.

When the current I1 is varied, the voltage drop amount at the resistance element 6014 is varied. In other words, the voltage on the side to be connected with the resistance element 6014 of the operational amplifier 6015 is varied. In this case, the operational amplifier 6015 outputs a control voltage Vcont corresponding to the difference between the voltage from the D/A converter 6016 and the voltage on the side to be connected with the resistance element 6014. For example, when the current I1 is increased, the operational amplifier 6015 reduces the control voltage Vcont. Thus, the operational amplifier 6015 performs feedback control of the control voltage Vcont, which enables electric power control so as to make constant the heating value of the heat generating element 501. As a result, supply of a heat to the dome 201 is performed with stability.

Further, the CONTROL UNIT 6011 may determine whether the supply current falls within a prescribed current range, or not, for example, based on the digital signal SG3. The CONTROL UNIT 6011 may determine that, when the supply current does not fall within a prescribed current range, an abnormal condition such as breakage of an element is caused at the heat generating element 501. The determination results may be outputted via the communication unit 6012, to be informed to the administrator of the pyranometer 10. In this manner, the convenience of the pyranometer 10 is improved.

Figure 3:
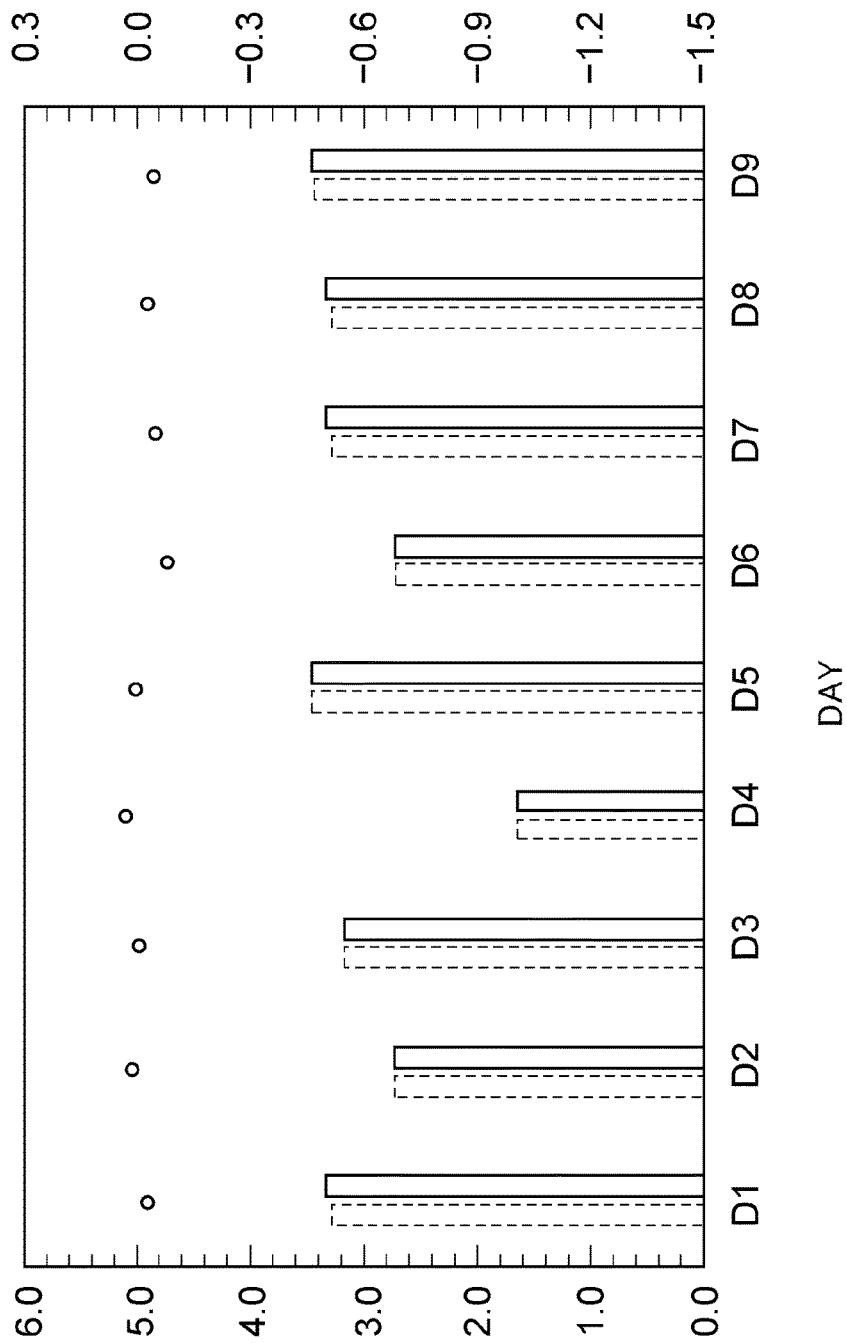
FIG. 3 is a view for illustrating the measurement results of the daily integrated amount of solar radiation by the pyranometer in accordance with the present embodiment.

Referring to FIG. 3, a description will be given to the measurement results of the daily integrated solar irradiance by the pyranometer 10. The bar graph of FIG. 3 shows the daily integrated solar irradiance in each day. The bar graph surrounded by a dotted line is the daily integrated solar irradiance measured by the pyranometer not having the heat generating element 501 (first daily integrated solar irradiance). The bar graph surrounded by a solid line is the daily integrated solar irradiance measured by the pyranometer 10 (second daily integrated solar irradiance). At the time of measurement by the pyranometer 10, the measurement was performed while the heat generating element 501 was generating a heat. The white circle of FIG. 3 is the ratio of the daily integrated solar irradiance in each day. The ratio of the daily integrated solar irradiance is calculated as ((second daily integrated solar irradiance)−(first daily integrated solar irradiance))/(first daily integrated solar irradiance)×100 [%]. The ratio of the daily integrated solar irradiance shows the difference between the first daily integrated solar irradiance and the second daily integrated solar irradiance, namely, a change in measured value due to whether heating by the heat generating element 501 has been performed or not. As shown in FIG. 3, in each day of dates of from D1 to D9, the ratio of the daily integrated solar irradiance falls within the range of ±0.1%. This means that the difference between the first daily integrated solar irradiance and the second daily integrated solar irradiance is very small, indicating that, also with the pyranometer 10, the measurement equal to that with a pyranometer not having the heat generating element 501 is possible. Accordingly, the pyranometer 10 can perform the measurement of the amount of solar radiation with precision while suppressing generation of dew and frost.

Herein, a description will be given to the dew suppressing effect and the frost suppressing effect by the pyranometer 10. Table 1 is the table for illustrating one example of the dew suppressing effect and the frost suppressing effect under environmental conditions of the weather, occurrence or non-occurrence of dew condensation, and occurrence or non-occurrence of frosting in different dates. Table 1 shows respective dew suppressing effects and frost suppressing effects of the pyranometer 10 and the pyranometer for comparison not having a heat generating element. As shown in Table 1, the pyranometer 10 has the dew suppressing effect and the frost suppressing effect.

TABLE 1

| Date | Weather | Occurrence or non-occurrence of dew condensation | Occurrence or non-occurrence of frosting | Pyranometer 10 (with a heat generating element) | Pyranometer for comparison (without heat generating element) |
|---|---|---|---|---|---|
| DAY 1 | Sunny | Not occurred | Occurred | Frost suppressing effect observed | No frost suppressing effect |
| DAY 2 | Sunny | Occurred | Not occurred | Dew suppressing effect observed | No dew suppressing effect |
| DAY 3 | Cloudy | Not occurred | Occurred | Frost suppressing effect observed | No frost suppressing effect |
| DAY 4 | Cloudy | Occurred | Not occurred | Dew suppressing effect observed | No dew suppressing effect |

Figure 4:
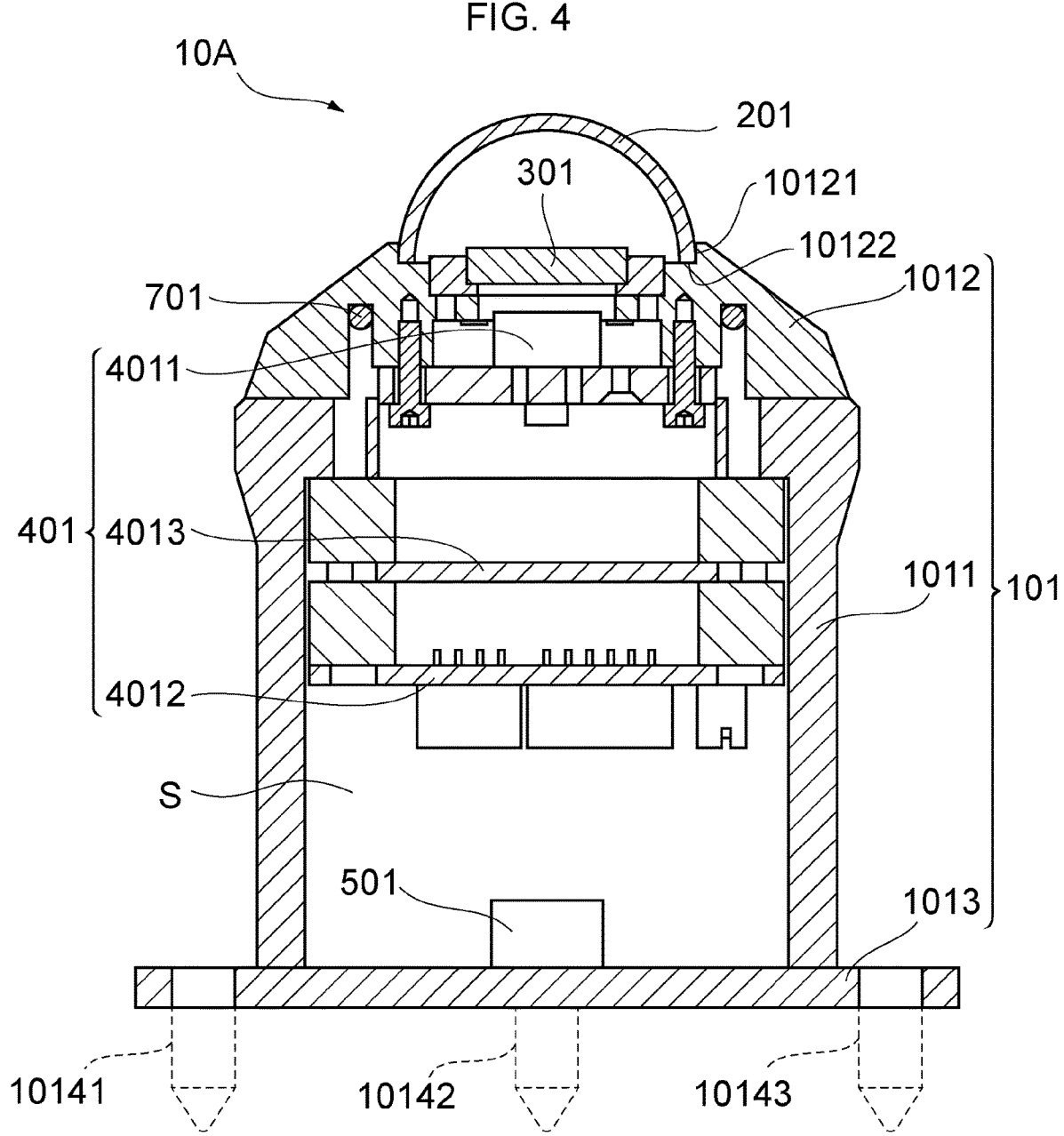
FIG. 4 is a cross sectional view of a pyranometer in accordance with Modified Example of the present embodiment.

Referring to FIG. 4, a description will be given to a pyranometer 10A in accordance with Modified Example of the present embodiment. With the pyranometer 10A, in the inside of a ceiling part 1012, a heat generating element 701 is provided so as to surround a dome 201. The heat generating element 701 is, for example, a resistance heater for generating a heat according to the current passing the heat generating element 701. As with the pyranometer 10A, the heat generating element 701 may be provided close to the dome 201 in addition to the heat generating element 501. Alternatively, the heat generating element 701 may be provided, for example, at the side surface of a barrel part 1011. Provision of additional heat generating element 701 enables such heating as to more stabilize the temperatures of the housing 101 and the dome 201.

The embodiments described up to this point are for facilitating understanding of the present invention, and is not for construing the present invention in a limited manner. Respective elements included in the embodiments, and the arrangement, materials, conditions, shapes, sizes thereof, and the like are not limited to those exemplified, and can be appropriately changed. Further, the configurations shown in different embodiments can be partially replaced, or combined.

REFERENCE SIGNS LIST

10, 10A Pyranometer
101 Housing
1011 Barrel part
1012 Ceiling part
1013 Bottom part
201 Dome
301 Diffuser
401 Sensor part
4011 Sensor element
501 Heat generating element
S Internal space

What is claimed is:

1. A pyranometer, comprising:
   a housing having an opening, and having thermal conductivity;
   a dome provided at the opening, and having light transmittance;
   a sensor part provided in an internal space formed by the housing and the dome, and for measuring an intensity of a sunlight made incident through the dome; and
   a heat generating component that conductably provides heat to a part of the housing, wherein the heat generating component is opposite to the opening across the internal space.

2. The pyranometer according to claim 1,
   wherein the heat generating component is a circuit element to be connected with a common power supply that also supplies power for driving the sensor part.

3. The pyranometer according to claim 1,
   wherein the sensor part stores a calibration factor for use in measurement of the intensity of the sunlight, and performs equal measurements of the intensity of the sunlight in any of a first state in which the heat generating component generates a heat and a second state in which the heat generating component does not generate a heat using the calibration value.

4. The pyranometer according to claim 1,
   wherein the heat generating component is controlled in electric power so as to provide a prescribed heating value according to a supply current to be supplied to the heat generating component.

5. The pyranometer according to claim 4,
   wherein in the case where the supply current does not fall within a prescribed current range, it is determined that an abnormal condition is caused at the heat generating component.

6. The pyranometer according to claim 1,
   wherein the heat generating component is a first heat generating component, and
   the housing has:
      a ceiling part provided with the opening,
      a bottom part provided with the heat generating part, and
      a barrel part for connecting the ceiling part and the bottom part,
   the pyranometer further comprising a second heat generating component provided at the ceiling part or the barrel part.

7. The pyranometer according to claim 1, wherein
   the heat generating component is mounted on a bottom part of the housing opposite to the opening across the internal space so as to be thermally connected to the housing and provide heat to the housing.

* * * * *